US010250746B2

United States Patent
Kumar et al.

(10) Patent No.: US 10,250,746 B2
(45) Date of Patent: Apr. 2, 2019

(54) METHOD AND SYSTEM FOR GROUP COMMUNICATION ACROSS ELECTRONIC MAIL USERS AND FEATURE PHONE USERS

(75) Inventors: Anshuman Kumar, Karnataka (IN); Rajiv Srivatsa, Chennai (IN); Sandeep Datar, Bangalore (IN)

(73) Assignee: OATH INC., New York, NY (US)

( * ) Notice: Subject to any disclaimer, the term of this patent is extended or adjusted under 35 U.S.C. 154(b) by 1028 days.

(21) Appl. No.: 13/207,423

(22) Filed: Aug. 11, 2011

(65) Prior Publication Data
US 2013/0040612 A1  Feb. 14, 2013

(51) Int. Cl.
*H04W 4/14* (2009.01)
*H04M 3/42* (2006.01)
*H04L 12/58* (2006.01)
*H04M 3/533* (2006.01)

(52) U.S. Cl.
CPC ...... *H04M 3/42382* (2013.01); *H04L 51/066* (2013.01); *H04W 4/14* (2013.01); *H04M 3/533* (2013.01); *H04M 2203/2044* (2013.01); *H04M 2203/2061* (2013.01); *H04M 2203/652* (2013.01)

(58) Field of Classification Search
USPC ........................................................ 455/466
See application file for complete search history.

(56) References Cited

U.S. PATENT DOCUMENTS

| | | | | |
|---|---|---|---|---|
| 7,133,687 | B1 * | 11/2006 | El-Fishawy et al. | ......... 455/466 |
| 8,737,975 | B2 * | 5/2014 | Engelhart, Sr. | ......... G10L 15/26 |
| | | | | 379/100.13 |
| 2001/0034225 | A1 * | 10/2001 | Gupte et al. | .................. 455/412 |
| 2004/0102201 | A1 * | 5/2004 | Levin | ............................ 455/466 |
| 2005/0010573 | A1 * | 1/2005 | Garg | .................. G06F 17/3089 |
| 2005/0124324 | A1 * | 6/2005 | Thomas et al. | ............ 455/412.1 |
| 2005/0130685 | A1 * | 6/2005 | Jenkin | ........................... 455/466 |
| 2006/0094453 | A1 * | 5/2006 | Rhyu | ..................... H04L 51/38 |
| | | | | 455/466 |
| 2007/0042812 | A1 * | 2/2007 | Basir | ................... H04M 1/6091 |
| | | | | 455/569.2 |
| 2007/0149223 | A1 * | 6/2007 | Liang | ................. H04L 12/5835 |
| | | | | 455/466 |
| 2007/0213082 | A1 * | 9/2007 | Ryu | .................. G06F 17/30041 |
| | | | | 455/466 |

(Continued)

*Primary Examiner* — Steven S Kelley
(74) *Attorney, Agent, or Firm* — James J. DeCarlo; Greenberg Traurig, LLP (57) ABSTRACT

Method and system for group communication across electronic mail users and feature phone users. A method for receiving electronic mails on a feature phone includes receiving a text message on the feature phone in response to a first electronic mail. The method also includes calling a telephonic number embedded in the text message to listen to an audio clip of the first electronic mail and providing a voice input as a response to the first electronic mail. The system includes a feature phone that receives a plurality of electronic mails. The system also includes one or more electronic devices, and a communication interface in electronic communication with the feature phone and the one or more electronic devices. The system further includes a memory that stores instructions, and a processor responsive to the instructions to receive a text message in response to an electronic mail transmitted by an electronic mail user.

9 Claims, 4 Drawing Sheets

(56) References Cited

U.S. PATENT DOCUMENTS

| | | | |
|---|---|---|---|
| 2008/0126961 A1* | 5/2008 | Naaman et al. | 715/764 |
| 2008/0139228 A1* | 6/2008 | Raffel | H04M 3/42195 455/466 |
| 2010/0009653 A1* | 1/2010 | Shkolnikov et al. | 455/405 |
| 2010/0056118 A1* | 3/2010 | Galicia et al. | 455/414.4 |
| 2010/0064345 A1* | 3/2010 | Bentley | G06F 21/31 726/3 |
| 2010/0081465 A1* | 4/2010 | May | H04M 1/6066 455/466 |
| 2010/0167700 A1* | 7/2010 | Brock | H04M 3/53333 455/413 |
| 2010/0178944 A1* | 7/2010 | Fodor | 455/466 |
| 2010/0285778 A1* | 11/2010 | Bluvband | H04L 51/066 455/412.2 |
| 2011/0007732 A1* | 1/2011 | Ward | H04M 3/42229 370/352 |
| 2011/0092187 A1* | 4/2011 | Miller | H04L 12/1818 455/412.1 |
| 2011/0241880 A1* | 10/2011 | Itou | H04M 1/576 340/540 |
| 2012/0077526 A1* | 3/2012 | Riffe | 455/466 |
| 2012/0295580 A1* | 11/2012 | Corner | H04W 12/12 455/405 |

\* cited by examiner

METHOD AND SYSTEM FOR GROUP COMMUNICATION ACROSS ELECTRONIC MAIL USERS AND FEATURE PHONE USERS

TECHNICAL FIELD

Embodiments of the disclosure relate to the field of group communication across electronic mail users and feature phone users.

BACKGROUND

In recent times, mobile phones are being widely utilized for communication. Low cost feature phones that only support voice and text communication are mostly used for communicating with each other. A short message service (SMS) is utilized for the text communication in a feature phone. Also, the feature phone does not support access to internet. Consequently, a feature phone user is refrained from transmitting and receiving electronic mails.

Typically, an electronic mail user can send an electronic mail to users having suitable electronic devices. However, the feature phone user is unable to receive the electronic mail due to limited facilities of the feature phone. Further, the feature phone user is unable to communicate with a group of users simultaneously.

In the light of the foregoing discussion there is a need for a method and a system for group communication across electronic mail users and feature phone users.

SUMMARY

The above-mentioned needs are met by a method, a computer program product and a system for group communication across electronic mail users and feature phone users.

An example of a method of receiving electronic mails on a feature phone includes receiving a text message on the feature phone in response to a first electronic mail transmitted by an electronic mail user. The method also includes calling a telephonic number embedded in the text message to listen to an audio clip of the first electronic mail. The method further includes providing a voice input as a response to the first electronic mail.

An example of a method includes calling a telephonic number using an electronic device. The method also includes providing a voice message as an input. The method further includes selecting one of a phone number and an electronic mail identifier of one or more users. The phone number corresponds to a feature phone user and the electronic mail identifier corresponds to an electronic mail user. Further, the method includes transmitting the voice message to the one or more users.

An example of a computer program product stored on a non-transitory computer-readable medium that when executed by a processor, performs a method of receiving electronic mails on a feature phone includes receiving a text message on the feature phone in response to a first electronic mail transmitted by an electronic mail user. The method also includes calling a telephonic number embedded in the text message to listen to an audio clip of the first electronic mail. The method further includes providing a voice input as a response to the first electronic mail.

An example of a system includes a feature phone that receives a plurality of electronic mails. The system also includes one or more electronic devices. The system further includes a communication interface in electronic communication with the feature phone and the one or more electronic devices. Further, the system includes a memory that stores instructions. Moreover, the system includes a processor responsive to the instructions to receive a text message in response to an electronic mail transmitted by an electronic mail user.

DETAILED DESCRIPTION OF THE EMBODIMENTS

The above-mentioned needs are met by a method, computer program product and system for group communication across electronic mail users and feature phone users. The following detailed description is intended to provide example implementations to one of ordinary skill in the art, and is not intended to limit the invention to the explicit disclosure, as one or ordinary skill in the art will understand that variations can be substituted that are within the scope of the invention as described.

Figure 1:
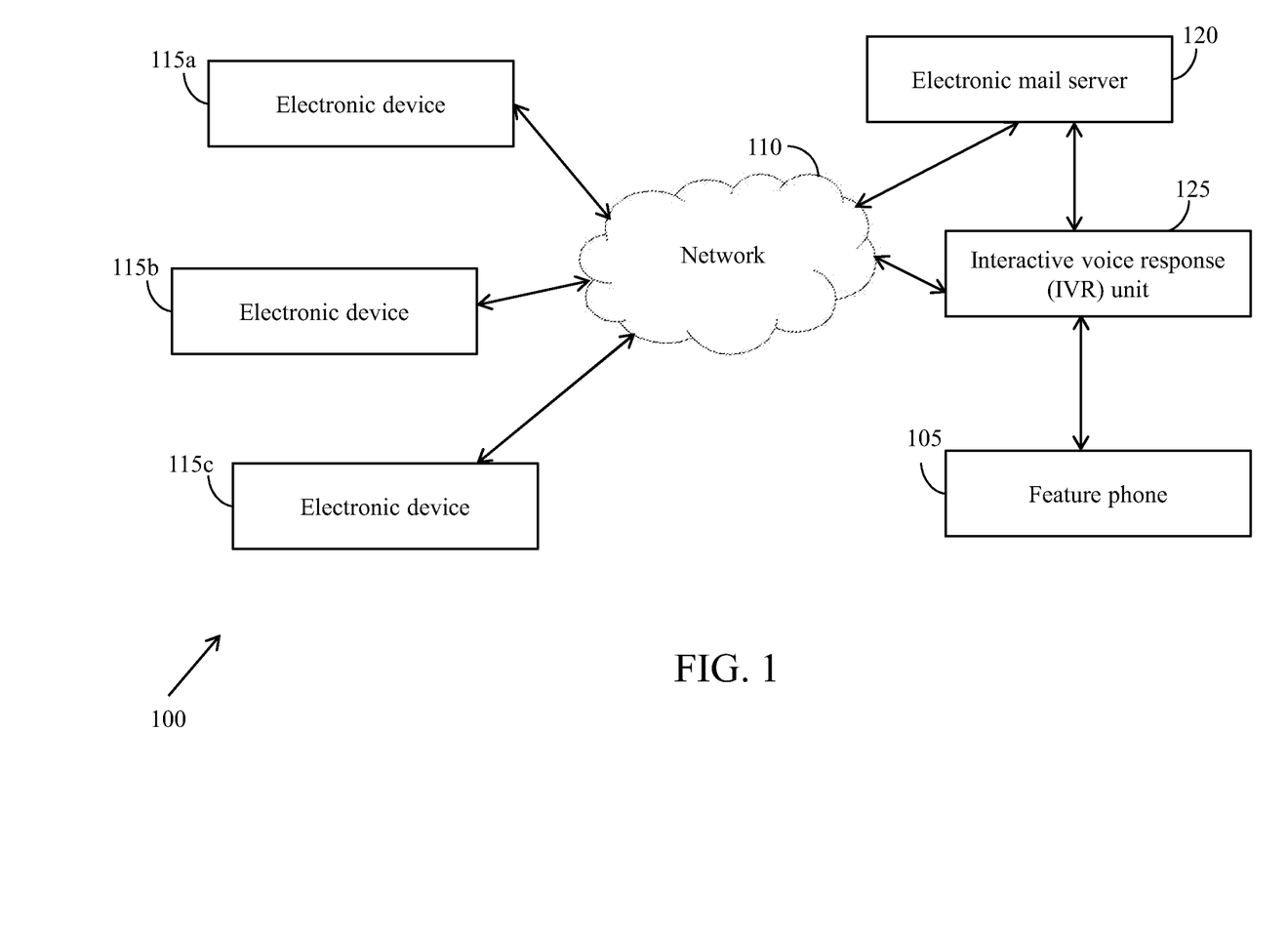
FIG. 1 is a block diagram of an environment, in accordance with which various embodiments can be implemented.

FIG. 1 is a block diagram of an environment 100, in accordance with which various embodiments can be implemented.

The environment 100 includes a feature phone 105. The environment 100 further includes one or more electronic devices, for example an electronic device 115a, an electronic device 115b, and an electronic device 115c, which can communicate with the feature phone 105 through a network 110. Examples of the electronic devices include, but are not limited to, computers, mobile devices, laptops, palmtops, hand held devices, telecommunication devices and personal digital assistants (PDAs). The environment 100 also includes an electronic mail (email) server 120 and an interactive voice response (IVR) unit 125, connected to the network 110. The feature phone 105 is connected to the network 110 via the IVR unit 125.

The email server 120 is in electronic communication with the electronic devices and the IVR unit 125 through the network 110. The email server 120 can be located remotely with respect to the electronic devices. Examples of the network 110 include, but are not limited to, a Local Area Network (LAN), a Wireless Local Area Network (WLAN), a Wide Area Network (WAN), internet, and a Small Area Network (SAN).

In some embodiments, an electronic device, for example the electronic device 115a, can perform functions of the email server 120.

In one example, the email server 120 receives multiple emails transmitted by one or more email users. Transmission details are specified using a transfer protocol, for example a simple mail transfer protocol (SMTP). Further, the email server 120 stores and forwards the multiple emails to the IVR unit 125 or to other email users.

An email user, using the electronic device 105a, can transmit an email to a feature phone user through the network 110. The email is first received by the email server 120 and can be stored for subsequent transmission. The IVR unit 125, coupled to the email server 120, prompts transmission of a text message to the feature phone user. The IVR unit 125 then converts the email into an audio clip. The text message received by the feature phone user on a feature phone, for example the feature phone 105, includes at least one of an identification of the email user, an email identifier associated with the email user, and a telephonic number. The feature phone user then calls the telephonic number to listen to the audio clip of the email. The feature phone user further provides a voice input as a response to the email. The email user then receives the voice input as an audio file embedded in another email.

Figure 2:
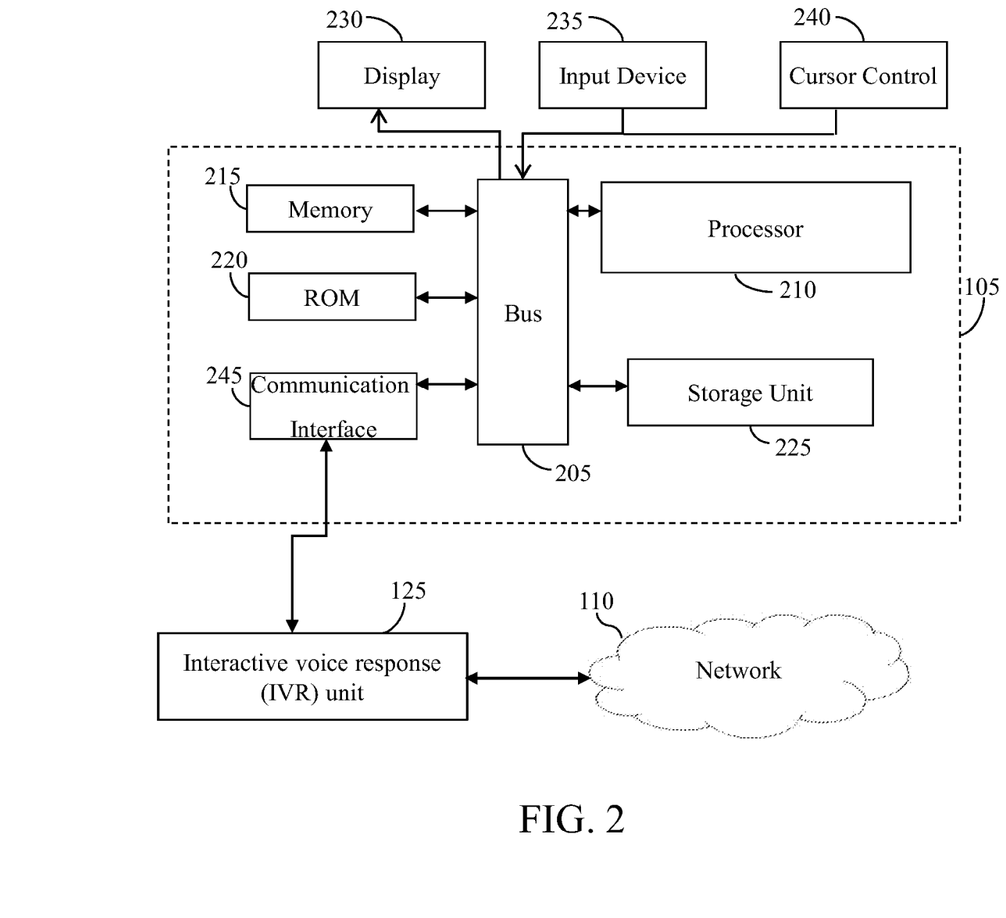
FIG. 2 is a block diagram of a feature phone for receiving electronic mails, in accordance with one embodiment.

The feature phone 105 including a plurality of elements is explained in detail in conjunction with FIG. 2.

FIG. 2 is a block diagram of the feature phone 105 for receiving electronic mails, in accordance with one embodiment.

The feature phone 105 includes a bus 205 or other communication mechanism for communicating information, and a processor 210 coupled with the bus 205 for processing information. The feature phone 105 also includes a memory 215, for example a random access memory (RAM) or other dynamic storage device, coupled to the bus 205 for storing information and instructions to be executed by the processor 210. The memory 215 can be used for storing temporary variables or other intermediate information during execution of instructions by the processor 210. The feature phone 105 further includes a read only memory (ROM) 220 or other static storage device coupled to the bus 205 for storing static information and instructions for the processor 210. A storage unit 225, for example a magnetic disk or optical disk, is provided and coupled to the bus 205 for storing information, for example information associated with a text message.

The feature phone 105 can be coupled via the bus 205 to a display 230, for example a cathode ray tube (CRT), for displaying the text message associated with an email. The input device 235, including alphanumeric and other keys, is coupled to the bus 205 for communicating information and command selections to the processor 210. Another type of user input device is the cursor control 240, for example a mouse, a trackball, or cursor direction keys for communicating direction information and command selections to the processor 210 and for controlling cursor movement on the display 230.

Various embodiments are related to the use of the feature phone 105 for implementing the techniques described herein. In some embodiments, the techniques are performed by the feature phone 105 in response to the processor 210 executing instructions included in the memory 215. Such instructions can be read into the memory 215 from another machine-readable medium, for example the storage unit 225. Execution of the instructions included in the memory 215 causes the processor 210 to perform the process steps described herein.

In some embodiments, the processor 210 can include one or more processing units for performing one or more functions of the processor 210. The processing units are hardware circuitry used in place of or in combination with software instructions to perform specified functions.

The term "machine-readable medium" as used herein refers to any medium that participates in providing data that causes a machine to perform a specific function. In an embodiment implemented using the feature phone 105, various machine-readable media are involved, for example, in providing instructions to the processor 210 for execution. The machine-readable medium can be a storage medium, either volatile or non-volatile. A volatile medium includes, for example, dynamic memory, such as the memory 215. A non-volatile medium includes, for example, optical or magnetic disks, for example the storage unit 225. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic media, a CD-ROM, any other optical media, punchcards, papertape, any other physical media with patterns of holes, a RAM, a PROM, and EPROM, a FLASH-EPROM, any other memory chip or cartridge.

In another embodiment, the machine-readable media can be transmission media including coaxial cables, copper wire and fiber optics, including the wires that comprise the bus 205. Transmission media can also take the form of acoustic or light waves, such as those generated during radio-wave and infra-red data communications. Examples of machine-readable media may include, but are not limited to, a carrier wave as described hereinafter or any other media from which the feature phone 105 can read. For example, the instructions can initially be carried on a magnetic disk of a remote computer. The remote computer can load the instructions into its dynamic memory and send the instructions over a telephone line using a modem. A modem local to the feature phone 105 can receive the data on the telephone line and use an infra-red transmitter to convert the data to an infra-red signal. An infra-red detector can receive the data carried in the infra-red signal and appropriate circuitry can place the data on the bus 205. The bus 205 carries the data to the memory 215, from which the processor 210 retrieves and executes the instructions. The instructions received by the memory 215 can optionally be stored on the storage unit 225 either before or after execution by the processor 210. All such media must be tangible to enable the instructions carried by the media to be detected by a physical mechanism that reads the instructions into a machine.

The feature phone 105 also includes a communication interface 245 coupled to the bus 205. The communication interface 245 provides a two-way data communication coupling to the network 110 via the IVR unit 125. For example, the communication interface 245 can be an integrated services digital network (ISDN) card or a modem to provide a data communication connection to a corresponding type of telephone line. As another example, the communication interface 245 can be a local area network (LAN) card to provide a data communication connection to a compatible LAN. In any such implementation, the communication interface 245 sends and receives electrical, electromagnetic or optical signals that carry digital data streams representing various types of information.

The processor 210 in the feature phone 105 receives a text message in response to an email transmitted by an email user. A feature phone user of the feature phone 105 calls a telephonic number embedded in the text message to listen to an audio clip of the email, and further provides a voice input as a response. The email user receives the response as an audio file embedded in another electronic mail from the feature phone user.

Figure 3:
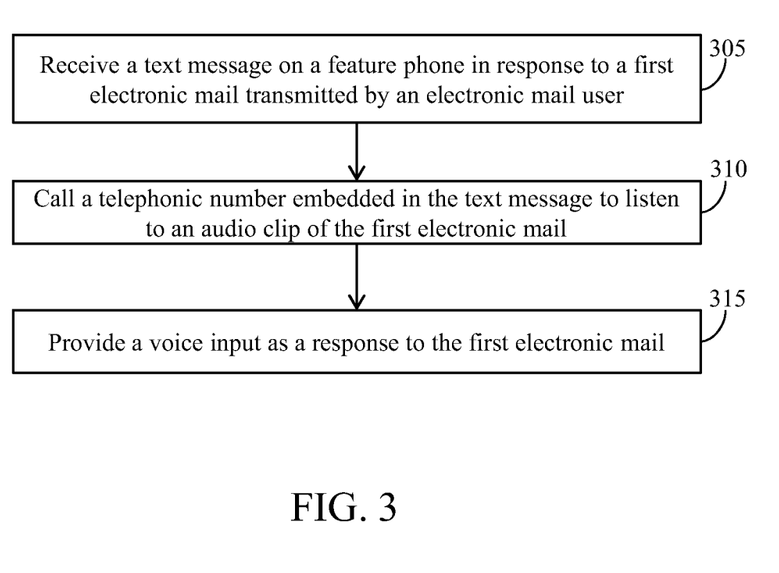
FIG. 3 is a flowchart illustrating a method of receiving electronic mails on a feature phone, in accordance with one embodiment.

FIG. 3 is a flowchart illustrating a method of receiving electronic mails on a feature phone, for example the feature phone 105, in accordance with one embodiment.

At step 305, a text message is received on the feature phone in response to a first email transmitted by an email user. The email user can transmit the first email to multiple users including a feature phone user and an electronic device user. The first email transmitted by the email user can include one or more of text, image and an audio file. Transmitting of the first email is performed by adding a phone number associated with the feature phone in a recipient list of the first email, or by entering an email identifier (ID) of the electronic device user in the recipient list of the first email. The first email is received by an email server, for example the email server 120 and converted into the text message by an interactive voice response (IVR) unit, for example the IVR unit 125. Conversion can be performed by configuring the IVR unit to generate the text message in response to the first email transmitted by the email user.

A telephonic number is embedded in the text message that enables the feature phone user to listen to the first email in form of an audio clip. The text message can also include an identification, for example a name and photo, of the email user and the email ID associated with the email user. The telephonic number can be similar for different feature phone users or different telephonic numbers can be provided for each of the different feature phone users.

At step 310, the feature phone user calls the telephonic number embedded in the text message to listen to the audio clip of the first email. Text present in the first email is converted to the audio clip by the IVR unit. In one example, text-to-speech (TTS) conversion is performed for converting the text included in the first email into the audio clip. A mobile service provider associated with the feature phone can allot the IVR unit to the feature phone user. The IVR unit can also be deployed in a public switched telephone network (PSTN).

The phone number associated with the feature phone user can be identified using the telephonic number. In some embodiments, the feature phone user needs to be authenticated when calling the telephonic number. Authentication can be performed by providing a username and a password by the feature phone user.

In some embodiments, if number of characters included in the first email is below a predefined number, for example 140 characters, then the text message can include the first email.

In some embodiments, the text message is a multilingual text message to enable easy understanding of the audio clip by the feature phone user. The first email can be converted into the multilingual text message by the IVR unit.

The audio clip of the first email is played to the feature phone user. The feature phone user can listen to the audio clip for making further decisions. The feature phone user can also respond to the first email.

At step 315, the feature phone user provides a voice input as a response to the first email. The voice input that is provided by the feature phone user is a response to a message present in the first email. The voice input is recorded by the IVR unit. Further, upon providing the voice input, the feature phone user adds the email ID of the email user. Adding the email ID can occur manually or automatically. The email user then receives the voice input as an audio file embedded in a second email by the feature phone user. The email user can listen to the audio file and take subsequent actions.

In some embodiments, the feature phone user can provide the response to a combination of one or more feature phone users and one or more email users simultaneously by adding respective phone numbers and email IDs.

In other embodiments, the feature phone user can provide the response as a reply to the multiple users that received the first email.

Figure 4:
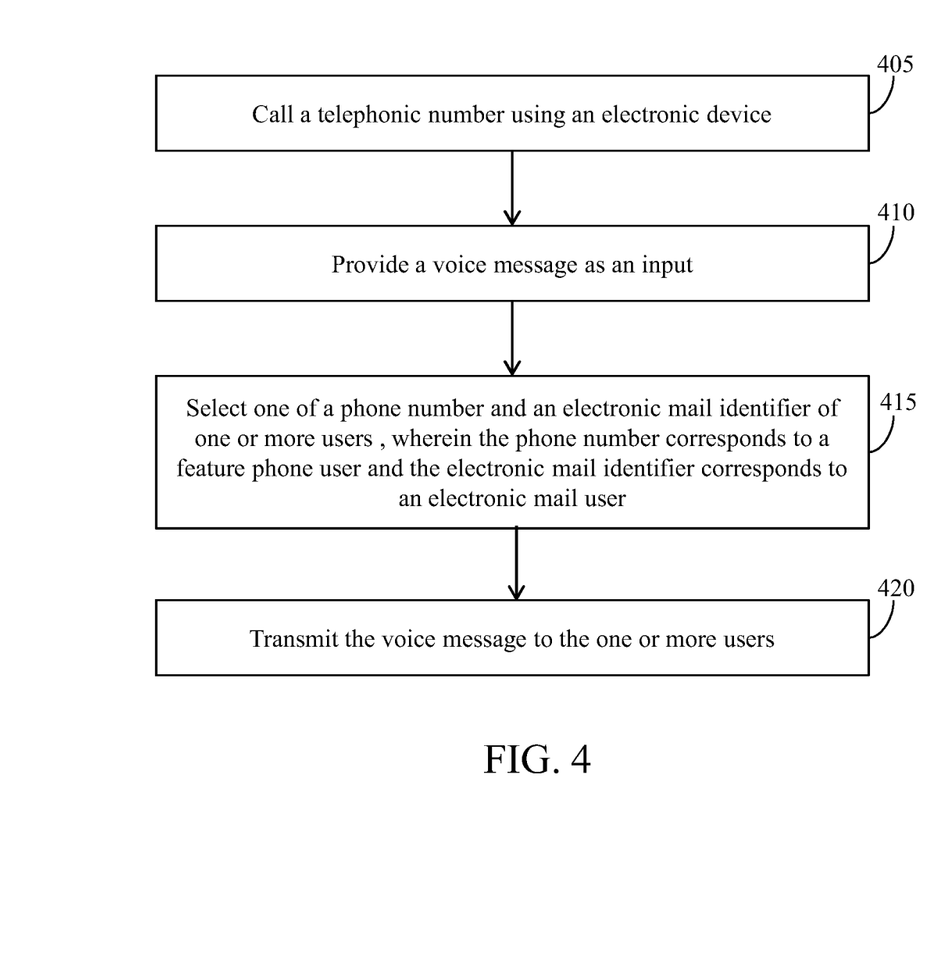
FIG. 4 is a flowchart illustrating a method of transmitting a voice message to one or more users, in accordance with one embodiment.

FIG. 4 is a flowchart illustrating a method of transmitting a voice message to one or more users, in accordance with one embodiment.

At step 405, an electronic device user calls a telephonic number using an electronic device, for example the electronic device 115a. The telephonic number can be obtained from a mobile service provider associated with the electronic device. Upon calling, a phone number associated with the electronic device is identified and further the electronic device user can be asked for authentication. The authentication can be performed by providing a username and a password by the electronic device user.

At step 410, the electronic device user provides the voice message as an input. The voice message provided by the electronic device user is recorded by an interactive voice response (IVR) unit.

At step 415, the electronic device user selects one of a phone number and an email identifier (ID) of the users to indicate an address for routing the voice message. The phone number corresponds to a feature phone user and the email ID corresponds to an email user.

In some embodiments, the electronic device user can configure one or more shortcut keys for storing the email ID and the phone number of the users.

In one example, the shortcut keys can store phone numbers and email IDs associated with a group of users. In another example, the shortcut keys can indicate transmission of the voice message to each user included in the group of users. In yet another example, the shortcut keys can specify if the voice message can be sent to one user in the group of users or to each user included in the group of users. The shortcut keys also enable immediate transmission of the voice message to the users.

At step 420, the voice message is transmitted to the users. If the users include email users then the transmission is performed using an electronic mail server, for example the electronic mail server 120. The electronic mail server routes and delivers the voice message to the email users. The email user then receives the voice message as an audio file embedded in an email. The email user can then listen to the voice message for taking further decisions.

Further, if the users include the feature phone user then the feature phone user receives a text message on a feature phone, for example the feature phone 105. The telephonic number is embedded in the text message that enables the feature phone user to receive the voice message. The feature phone user then calls the telephonic number to listen to the voice message. Upon listening to the voice message, the feature phone user can also provide a voice input as a response to the voice message received from the electronic device user.

In some embodiments, the response is transmitted to at least one of the electronic device user and the users.

The method specified in the present disclosure enables a feature phone user to receive emails on a feature phone by converting text included in an email to an audio clip. The method also enables communication across a group of people that use email over internet, and voice or text message over feature phones. The method enables acquiring of a higher number of email users, for example Yahoo!® email users, that are new to the internet. The method enhances current email offerings of an email organization, for example Yahoo!®. The method using the IVR capabilities can further be extended to other email organization products and services, for example Yahoo!® products and services.

It is to be understood that although various components are illustrated herein as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device.

Accordingly, the disclosure of the present invention is intended to be illustrative, but not limiting, of the scope of the invention, which is set forth in the following claims.

What is claimed is:

1. A method comprising:
    receiving, by a processor, a first electronic mail from an electronic mail user;
    converting, by the processor, the first electronic mail to an audio clip in response to the receipt of the first electronic mail;
    generating, by the processor, a text message for communication to a user of a feature phone, said text message comprising embedded information referencing the audio clip, and further comprising a name of the electronic mail user, and an email identifier of the electronic mail user;
    authenticating, by the processor, the user of the feature phone by requesting a username and password of the feature phone user;
    comparing, by the processor, a number of characters in the first electronic mail to a predefined number;
    when the number of characters in the first electronic mail is below the predefined number, including, by the processor, the first electronic mail in the text message;
    when the number of characters in the first electronic mail is above the predefined number or when the first electronic mail has been included in the text message, transmitting, by the processor, the text message to the feature phone;
    receiving, by the processor, a voice input provided by the feature phone user as a response to the first electronic mail;
    receiving, by the processor, the email identifier of the electronic mail user from the feature phone;
    creating and storing, by the processor, a shortcut key, said shortcut key comprising the email identifier of the electronic mail user and a phone number of the electronic mail user;
    embedding, by the processor, the voice input as an audio file in a second electronic mail; and
    transmitting, by the processor, the second electronic mail to the electronic mail user via the shortcut key.

2. The method of claim 1, wherein the text message comprises a multilingual text message for the feature phone user.

3. The method of claim 1, wherein a telephone number is included in said text message, and said telephone number is associated with one of the feature phone user and a plurality of feature phone users.

4. A non-transitory computer-readable storage medium comprising processor executable instructions that when executed by a processor of a computing device, perform a method comprising:
    receiving, by the processor, a first electronic mail from an electronic mail user;
    converting, by the processor, the first electronic mail to an audio clip in response to the receipt of the first electronic mail;
    generating, by the processor, a text message for communication to a user of a feature phone, said text message comprising embedded information referencing the audio clip, and further comprising a name of the electronic mail user, and an email identifier of the electronic mail user;
    authenticating, by the processor, the user of the feature phone by requesting a username and password of the feature phone user;
    comparing, by the processor, a number of characters in the first electronic mail to a predefined number;
    when the number of characters in the first electronic mail is below the predefined number, including, by the processor, the first electronic mail in the text message;
    when the number of characters in the first electronic mail is above the predefined number or when the first electronic mail has been included in the text message, transmitting, by the processor, the text message to the feature phone;
    receiving, by the processor, a voice input provided by the feature phone user as a response to the first electronic mail;
    receiving, by the processor, the email identifier of the electronic mail user from the feature phone;

creating and storing, by the processor, a shortcut key, said shortcut key comprising the email identifier of the electronic mail user and a phone number of the electronic mail user;

embedding, by the processor, the voice input as an audio file in a second electronic mail; and transmitting, by the processor, the second electronic mail to the electronic mail user via the shortcut key.

5. The medium of claim 4, the text message comprising a multilingual text message for the feature phone user.

6. The medium of claim 4, a telephone number is included in said text message, and said telephone number being associated with a plurality of feature phone users.

7. An apparatus comprising:

a processor; and a non-transitory computer-readable storage medium for tangibly storing thereon program logic for execution by the processor, the stored program logic comprising:

electronic mail receiving logic executed by the processor for receiving a first electronic mail from an electronic mail user;

converting logic executed by the processor for converting the first electronic mail to an audio clip in response to the receipt of the first electronic mail;

text message generating logic executed by the processor for generating a text message for communication to a user of a feature phone, said text message comprising embedded information referencing the audio clip, and further comprising a name of the electronic mail user, and an email identifier of the electronic mail user;

authentication logic executed by the processor for authenticating the user of the feature phone by requesting a username and password of the feature phone user;

comparing logic executed by the processor for comparing a number of characters in the first electronic mail to a predefined number;

email including logic executed by the processor for, when the number of characters in the first electronic mail is below the predefined number, including the first electronic mail in the text message;

transmitting logic executed by the processor for, when the number of characters in the first electronic mail is above the predefined number or when the first electronic mail has been included in the text message, transmitting the text message to the feature phone;

voice input receiving logic executed by the processor for receiving a voice input provided by the feature phone user as a response to the first electronic mail;

email identifier receiving logic executed by the processor for receiving the email identifier of the electronic mail user from the feature phone;

creating and storing, by the processor, a shortcut key, said shortcut key comprising the email identifier of the electronic mail user and a phone number of the electronic mail user;

embedding logic executed by the processor for embedding the voice input as an audio file in a second electronic mail; and second email transmitting logic executed by the processor for transmitting the second electronic mail to the electronic mail user via the shortcut key.

8. The apparatus of claim 7, wherein the text message comprises a multilingual text message for the feature phone user.

9. The apparatus of claim 7, the storage medium further comprising:

authenticating logic executed by the processor for authenticating the feature phone user upon receiving a call from the feature phone user via a telephone number associated with the feature phone.

* * * * *